United States Patent

Tedesco

[11] Patent Number: 5,816,681
[45] Date of Patent: Oct. 6, 1998

[54] INCONSPICUOUS LIGHT SOURCES PARTICULARLY FOR VEHICULAR APPLICATIONS

[75] Inventor: James M. Tedesco, Livonia, Mich.

[73] Assignee: Kaiser Optical Systems, Inc., Ann Arbor, Mich.

[21] Appl. No.: 552,268

[22] Filed: Nov. 2, 1995

[51] Int. Cl.⁶ .................. B60Q 1/00; F21V 9/00; F21V 11/00

[52] U.S. Cl. .................. 362/80; 362/351; 362/293; 362/800

[58] Field of Search ............... 362/19, 80, 351, 362/293, 800, 355; 359/15, 19

[56] References Cited

U.S. PATENT DOCUMENTS

| | | | |
|---|---|---|---|
| 5,010,458 | 4/1991 | Fraizer | 362/80 |
| 5,278,731 | 1/1994 | Davenport | 362/32 |
| 5,455,947 | 10/1995 | Aoyama | 359/19 |
| 5,488,493 | 1/1996 | Moss | 359/15 |
| 5,711,592 | 1/1998 | Hotta | 362/80 |

Primary Examiner—Sandra L. O'Shea
Assistant Examiner—Matthew J. Spark
Attorney, Agent, or Firm—Gifford,Krass,Groh, Sprinkle,Patmore, Anderson & Citkowski

[57] ABSTRACT

A lighting assembly includes an on/off source of light and an optical diffuser characterized in that it receives light from the source and emits it in a desired viewing direction, but with underlying surfaces being at least diffusely visible therethrough. Thus, in an automotive or other vehicular application, the surface may be a body panel, the color of which may be visibly evident through the diffuser panel, thereby enhancing desired aerodynamic/styling characteristics. The source of light preferably comprises one or more semiconductor devices such as light-emitting diodes, and the optical diffuser is holographically recorded and provide high transmission and low backscatter to shape the emitted light in addition to its redirection in accordance with a desired beam profile or cross section.

16 Claims, 1 Drawing Sheet

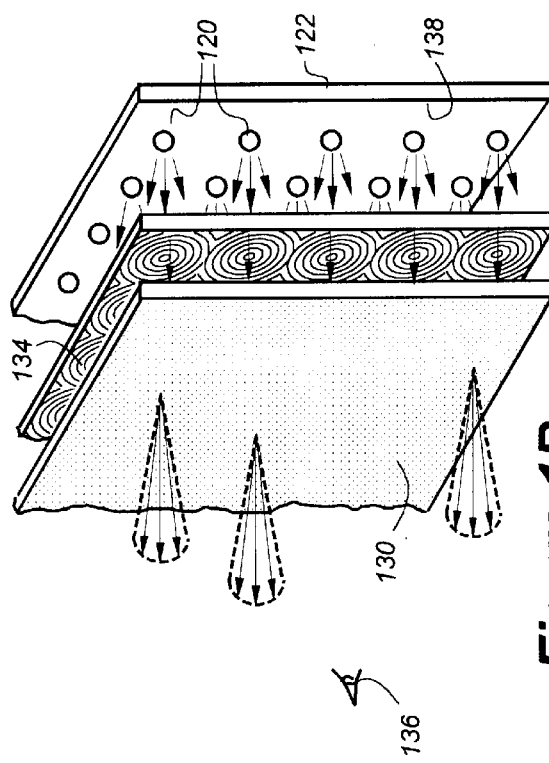
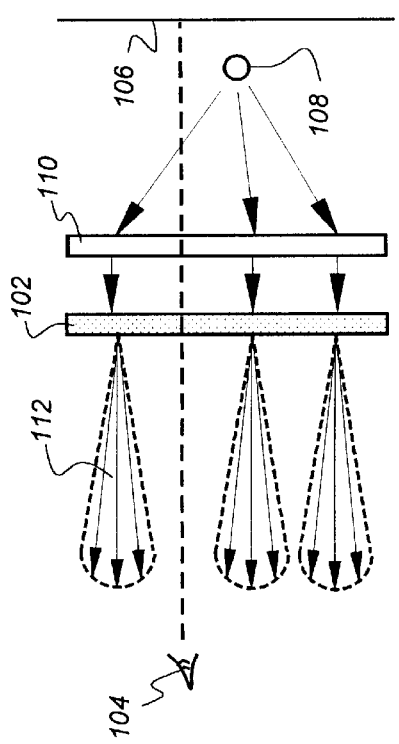
Figure 1A
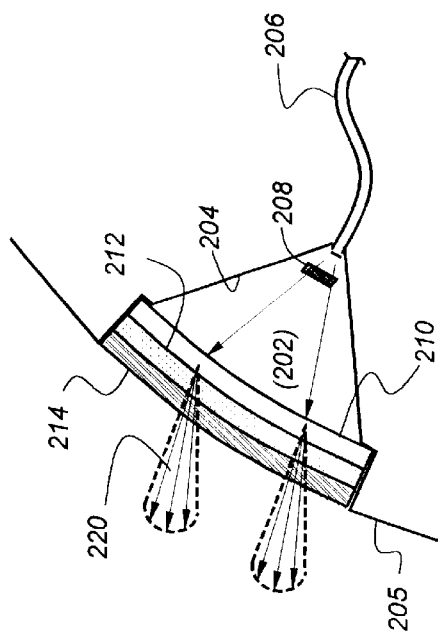
Figure 1B
Figure 2

INCONSPICUOUS LIGHT SOURCES PARTICULARLY FOR VEHICULAR APPLICATIONS

FIELD OF THE INVENTION

This invention relates generally to lighting, and in particular, to light sources which visibly blend with underlying and surrounding supporting panels and structures. As such, in a vehicular application, arrangements according to the invention minimize obscuration of body styling by exposing the color of an underlying body panel when not illuminated.

BACKGROUND OF THE INVENTION

Vehicle styling, particularly automotive styling, has changed significantly in recent years. The quest for aerodynamic body shapes has led to styles exhibiting very smooth contours, in marked contrast to previous body styles, which generally did not consider aerodynamics and/or fuel economy.

As part of this desire for smooth contours, several innovations in automotive body styling have emerged. Bumpers, for example, once convoluted metal shapes which protruded from the front and back of the car body, have now receded into the body itself, as molded sections. Externally visible lights, including head lamps, tail lights, running lights, and so forth, have also generally evolved to include molded, contoured surfaces which simultaneously reduce wind resistance and help to maintain body shape and styling.

For example, tail lights, including brake lights and backup lights, previously included separate sections, often with different lenses and protruding features. Today, however, one is more likely to find a single plastic lens behind which most or all of the associated light sources reside, the lens often wrapping around the back and rear quarter panel of the car, so as to provide both rear and side viewing.

To provide head lights with an aerodynamic contour, two techniques are popular. The first is to position each head lamp on a rotatable and retractable mounting unit, so that when the head lamp is not in use an observer sees only an outline of an upper panel, which is flush with the surrounding hood surfaces and colored to blend in. As an alternative, the head lamps are set back from the front of the car to a degree which enables a clear plastic aerodynamic panel to be permanently mounted in the path of the beam, in which case the lamps are recessed enough so that the beams may be properly aligned.

The techniques just described present several drawbacks. Although large lenses associated with tail lighting may result in an overall smooth contour, these plastic lenses must necessarily be the same color as the desired color of the light, even when the associated light is not in use. In other words, red lenses must be used for tail lights and brake lights, which results in a red surface at all times. If the vehicle is any color other than an exact match to the lens color, continuity of body color is disrupted, even though continuity of body style may generally be maintained.

The drawbacks are more serious with regard to headlighting. Retractable units maintain body color and styling, but the requisite rotatable mounting means introduce significant electrical and mechanical complications which dramatically increase cost and introduce maintenance problems. When recessed head lamps are used in conjunction with clear panels, body contour may be continuous, but the lamps are obtrusive and visible behind their clear windows, and the assembly often wastes volume within the vehicle body which could otherwise be used for different purposes.

Based upon the foregoing, there remains a need for a light source which, particularly in an off condition, better blends with underlying and surrounding support structures to be less conspicuous. In a vehicular application, such a light source would be less disruptive to body characteristics, including contour and coloring while, ideally, remaining aerodynamic. Accordingly, depending upon the configuration, such an improved light source would be applicable to all forms of stylistic lighting including, in the case of vehicles, interior lights, tail lights, brake lights, back-up lights, running lights, head lights, and even license plate lights, and so forth.

SUMMARY OF THE INVENTION

According to the invention, a lighting assembly for installation between an observer and a colored surface includes an on/off source of light and an optical diffuser having a back surface which receives light from the source and a front surface from which the light emerges in a desired pattern of illumination. The diffuser is characterized in that it has sufficiently high transmission and low backscatter so as to present a color to the viewer that largely matches the color of the light source when illuminated, yet enables an observer to see an underlying colored surface through the diffuser when the light source is turned off. Thus, in an automotive or other vehicular application, the surface may be a body panel, the color of which may be visibly evident through the diffuser panel when the source is off, thereby affording a less conspicuous arrangement.

The source of light may comprise one or more discrete devices, including semiconductor devices such as light-emitting diodes or remotely illuminated fiber-optic light guides may be employed. To achieve the desired level of transmission and backscatter reduction, the optical diffuser is preferably fabricated using holographic techniques. This approach also readily enables the emitted light to be shaped in accordance with a desired beam profile or cross section.

In one particular embodiment, an assembly according to the invention includes a housing having an inner surface and a light-exiting aperture, with the diffuser being supported thereover, and an on/off source of light in the housing configured to direct the light generally toward the light-exiting aperture and through the optical diffuser. An optical element such as Fresnel lens may also be provided between the light source and diffuser to provide the diffuser with light which is more collimated.

BRIEF DESCRIPTION OF THE DRAWINGS

FIG. 1A is a simplified side-view representation using ray tracing to illustrate important principles of this invention;

FIG. 1B is a drawing of an alternative embodiment utilizing an array of light-emitting diodes; and FIG. 2 is one assembly shown in cross-section according to the invention particularly suited to automotive and other vehicular applications.

DETAILED DESCRIPTION OF THE PREFERRED EMBODIMENT

The present invention provides light sources which better visibly blend with their mounting environment, so as to be less conspicuous. In particular, the invention takes advantage of a high-transmission, low-backscatter diffuser to reveal underlying colored surfaces, particularly in the nonilluminated state. In the preferred embodiment, holographically formed optical diffuser panels are used, since such panels may be recorded to redirect light in desired beam shapes, while remaining at least translucent when the light source is in an off condition, enabling an underlying surface color to be at least diffusely visible therethrough.

Lighting assemblies according to the invention may therefore be used to provide lights for vehicles in which the intensity or color of the lamp in the off state is very different from that when activated. This allows head lamps, tail lights, running lights, and so forth, to blend more closely with the body color of the car when the lamps are not illuminated, thereby enhancing stylistic and/or aerodynamic features. Although the concepts described herein are ideal for such vehicular applications, the invention may readily be extended to numerous other uses, including consumer products, appliances, and so forth which might benefit from lights which function according to the invention.

A conventional head lamp assembly typically consists of a light bulb, reflector and multi-faceted lens to shape the light into the desired illumination pattern. Regardless of whether these components are separate or integrated, the result is the appearance of a "silvery" patch surrounded by supporting surfaces, this silvery appearance resulting from the reflector as viewed through the lens. On a tail lamp, turn signal or running light, etc., the appearance of the color of the lens is clearly evident and results from the dye introduced through plastic or glass used to generate the desired illumination color, be it red, amber, orange, etc.

The structure of a lamp assembly according to this invention is fundamentally different from conventional structures just described. As shown in FIG. 1A, the invention places an optical diffuser 102 between an observer 104 and a surface 106 of an object, which may be a vehicle body. Between the diffuser 102 and the surface 106 there is disposed one or more sources of light which may take on any appropriate form, including discrete emitters or the output of a fiber or bundle bringing illumination in from a remote source. Although the diffuser 102 may be of conventional design, in the preferred embodiment, the invention relies on the high-transmission and low-backscatter capabilities possible with holographically produced diffusing panels which reduce reflections of white ambient light. Use of a holographic optical element (HOE) also allows the diffuser to be "recorded" with an intentionally tailored transmission or scattering pattern 112, but which is otherwise substantially transparent or translucent, that is, having very low backscatter in comparison with conventional diffusers, yet very "structureless" in comparison with conventional faceted lenses. To record the diffusing panel a surface-relief precursor or volume-phase material such as dichromated gelatin (DCG) is exposed to a diffuser source through an aperture, the aspect ratio of the aperture along with other exposure and processing conditions being ultimately responsible for the tailored transmission pattern of the diffuser, be it of the volume-phase or surface-relief type.

Although light from the source 108 may strike the backside of the diffuser panel 102 directly, in the preferred embodiment a separate element 110 is disposed between the diffuser 102 and the source 108 to collimate or otherwise shape or concentrate the light from the source prior to its impinging on the diffuser 102, thereby helping to allow the diffuser 102 to provide a more consistent pattern 112. In the preferred embodiment, the element 110 comprises one or more Fresnel patterns, and, although the element 110 is shown spaced apart from the diffuser 102. in practice they may be sandwiched together in close proximity. In terms of the patern, 112, either symmetrical or asymmetrical scattering may be possible, particularly if a holographic fabrication process is used.

The source 108 may be of any color so that, when illuminated, lobes 112 are directed to a viewer 104, causing the surface of the diffuser 102 to appear to glow with the source color. However, with the source 108 turned off, due to the high-transmission and low-backscatter properties of the diffuser 102, the observer 104 is able to view the surface 106 through the diffuser 102 and element 110, if provided, so that the color of the surface 106 is at least diffusely visible, thereby providing a source of light, which may consume a relatively large surface area, but which largely "disappears" when the source 108 is switched off. Although the invention allows a surface color to be visibly evident when not illuminated, it should be appreciated that the principles disclosed herein readily extend to underlying surface textures, shapes, or other visual attributes which desirably come into view during periods of non-illumination.

As shown in Figure 1B, multiple light sources 120 may be used, preferably arranged in array form on a supporting member 122. Again, although light from the sources 120 may impinge directly upon the diffuser 130, preferably an array of collimating elements is provided, one element associated with each of the light sources 120 to collimate the light impinging upon the back side of the diffuser 130. For example, as shown, a panel 134 may be used having an array of Fresnel lenses thereby providing a relatively thin configuration overall. As with all embodiments of the invention, when the sources 120 are switched off, an observer 136 is able to view the surface 138 of the panel 122 facing the observer with the color of the surface 138 being at least diffusely visible through the diffuser 130 and collimating lenses 134. In place of the discrete emitters 120, the panel 122 may contain apertures through which light emerges from a common source, including light carried by a bundle of optical fibers feeding such apertures. In yet a further alternative embodiment, light may be provided to the diffuser through an edge-lit source such as the wedge light provided by Display Engineering of Palo Alto, Calif. or the Spectraview product available from Allied Signal of Morristown, N.J. Bright View of Toledo, Ohio also offers such an edge-lit backlight. Total internal reflection (TIR) lenses or optics may also be used and are available from TIR Technologies, Costa Mesa, Calif.

FIG. 2 illustrates an embodiment according to the invention which might be particularly suitable to a vehicular automotive application, such as a headlamp. In this case, a cavity or depression 202 may be provided in a vehicle panel, through a conventional stamping process. Conveniently, this recess and surrounding areas may be painted at the same time, resulting in an inner surface 204 and an outer surrounding surface 205 which are the same color.

Light is provided in the cavity 202, again, either through one or more discrete sources or it may be piped in through a light-carrying conduit 206, as shown. The source may either be emitted at a particular color or filtered to provide a desired color, and in the case of delivery from a remote source, purposely colored light may be brought in or filtered more proximate to the diffuser assembly, for example, through the use of a filter 208.

Light emerging from the conduit 206, having been filtered by the element 208, preferably passes through a collimation element 210 and is scattered by the high-transmission, low-backscatter diffuser 212. Preferably, in an application such as that shown in FIG. 2 which might be exposed to the elements, an outer protective element 214 may be added for protection.

Various qualities should be noted in FIG. 2. First, the diffuser 212 and associated elements need not be planar, but may be curved, for example, to achieve a particular surface shape. Additionally, the scatter patterns 220 need not be normal to the point where they emerge from the diffuser 212, but may exit at a particular angle. Such an exit angle and/or exit beam cross section may both be tailored during the holographic process used to fabricate the diffuser 212. Finally, it should be noted that the elements shown in FIG. 2 are not necessarily to scale, and in practice, the diffuser and adjoining panels may be much thinner than that implied in the figure. Also, the source of light is preferably physically much smaller than the opening into which the diffuser 212 is mounted so that when the source is turned off, more of the exposed surface 204 of the housing is visually evident through the diffuser panel.

Having thus described my invention, I claim:

1. A light-emitting assembly for installation over a colored surface, comprising:

a source of light which may be turned on and off;

a visibly featureless optical diffuser having a back surface to receive light directly from the source and a front surface from which the light emerges in a predetermined scattering pattern, the diffuser having sufficiently high light transmission and low backscatter that the colored surface is at least diffusely visible through the diffuser when the source of light is turned off.

2. The light-emitting assembly of claim 1 wherein the diffuser is fabricated using a holographic recording.

3. The light-emitting assembly of claim 1 further including light collimating means disposed between the source of light and the diffuser.

4. The light-emitting assembly of claim 1 including a light-emitting diode as the source of light.

5. The light-emitting assembly of claim 1 including the source of light is of a particular color.

6. The light-emitting assembly of claim 1 wherein the colored surface comprises a portion of a vehicle body.

7. The light-emitting assembly of claim 1 further including means to collimate the light before reaching the diffuser.

8. A light-emitting assembly, comprising:

an object having a colored surface;

a visibly featureless optical diffuser disposed over the surface; and an on/off source of light supported behind the diffuser and oriented theretoward so that the light is scattered by the diffuser when the source is turned on, the diffuser having sufficiently high light transmission and low backscatter that the colored surface is at least diffusely visible through the diffuser when the source of light is turned off.

9. The light-emitting assembly of claim 8 wherein the optical diffuser is a holographic diffuser.

10. The light-emitting assembly of claim 8 wherein the on/off source of light is a colored source of light.

11. The light-emitting assembly of claim 8 wherein the object is a motor vehicle body.

12. A vehicle light, comprising:

an optical diffuser supported over and covering a portion of a surface of a motor vehicle;

an on/off source for backlighting the optical diffuser, the diffuser having sufficiently high light transmission and low backscatter that the surface of the vehicle is at least diffusely visible through the diffuser when the source is off.

13. The vehicle light of claim 12 wherein the optical diffuser and source function cooperatively as a head lamp of the vehicle.

14. The vehicle light of claim 12 wherein the optical diffuser and source function cooperatively as a tail lamp of the vehicle.

15. The vehicle light of claim 12 wherein the optical diffuser and source function cooperatively as a brake light of the vehicle.

16. The vehicle light of claim 12 wherein the optical diffuser and source function cooperatively as a running light of the vehicle.

* * * * *